(12) United States Patent
Endo

(10) Patent No.: US 10,165,653 B2
(45) Date of Patent: Dec. 25, 2018

(54) VEHICLE REAR LAMP

(71) Applicant: KOITO MANUFACTURING CO., LTD., Tokyo (JP)

(72) Inventor: Osamu Endo, Shizuoka (JP)

(73) Assignee: KOITO MANUFACTURING CO., LTD., Minato-ku, Tokyo (JP)

( * ) Notice: Subject to any disclaimer, the term of this patent is extended or adjusted under 35 U.S.C. 154(b) by 0 days.

(21) Appl. No.: 15/511,705

(22) PCT Filed: Sep. 8, 2015

(86) PCT No.: PCT/JP2015/075401
§ 371 (c)(1),
(2) Date: Mar. 16, 2017

(87) PCT Pub. No.: WO2016/043086
PCT Pub. Date: Mar. 24, 2016

(65) Prior Publication Data
US 2017/0265278 A1  Sep. 14, 2017

(30) Foreign Application Priority Data
Sep. 17, 2014 (JP) .................. 2014-188460

(51) Int. Cl.
*B60Q 1/30* (2006.01)
*H05B 37/02* (2006.01)
(Continued)

(52) U.S. Cl.
CPC ........... *H05B 37/0227* (2013.01); *B60Q 1/30* (2013.01); *F21S 43/00* (2018.01); *G05D 1/0088* (2013.01); *G06K 9/00825* (2013.01)

(58) Field of Classification Search
CPC .................. H05B 33/089; B60Q 1/143; B60Q 2300/056; B60Q 2300/42
(Continued)

(56) References Cited

U.S. PATENT DOCUMENTS 3,011,580 A  12/1961  Reid
2004/0160786 A1  8/2004  Bauer et al.
(Continued)

FOREIGN PATENT DOCUMENTS

CN  103600687 A  2/2014
FR  2870355 A1  11/2005
(Continued)

OTHER PUBLICATIONS

Translate_jp211-037414.*
(Continued)

*Primary Examiner* — Douglas W Owens
*Assistant Examiner* — Syed M Kaiser
(74) *Attorney, Agent, or Firm* — Sughrue Mion, PLLC

(57) ABSTRACT

A rear lamp (RL) provided on a rear part of a vehicle (CAR1), wherein the rear lamp (RL) includes, in addition to a normal lamp, a sub-tail lamp (STL) configured to be lit on at least when a following vehicle is self-driving and to be detectable by the following vehicle when lit on. Since the following vehicle detects the sub-tail lamp (STL) lit in addition to the normal lamp, it is possible to detect the sub-tail lamp (STL) more accurately and more reliably than in detection of the normal lamp, and to detect the preceding vehicle (CAR1) in a highly accurate and quick manner.

10 Claims, 7 Drawing Sheets

(51) Int. Cl.
*F21S 43/00* (2018.01)
*G05D 1/00* (2006.01)
*G06K 9/00* (2006.01)

(58) Field of Classification Search
USPC .................................. 364/465, 467; 315/77
See application file for complete search history.

(56) References Cited

U.S. PATENT DOCUMENTS

| | | | |
|---|---|---|---|
| 2010/0214791 A1* | 8/2010 | Schofield | B60Q 1/1423 362/466 |
| 2011/0006684 A1* | 1/2011 | Hodgson | H05K 1/0284 315/77 |
| 2012/0229645 A1* | 9/2012 | Yamada | B60Q 1/2665 348/148 |
| 2013/0329445 A1* | 12/2013 | Oh | B60Q 1/0041 362/543 |
| 2013/0345935 A1* | 12/2013 | Chang | F02D 11/106 701/49 |
| 2014/0049973 A1* | 2/2014 | Adachi | B60Q 1/085 362/465 |
| 2014/0169010 A1* | 6/2014 | Imaeda | B60Q 1/143 362/460 |
| 2014/0265843 A1* | 9/2014 | Troxler | B60Q 1/2673 315/77 |
| 2014/0355280 A1* | 12/2014 | Fujiyoshi | B60Q 1/143 362/465 |
| 2015/0055357 A1* | 2/2015 | Nakatani | F21S 41/143 362/466 |
| 2015/0267889 A1* | 9/2015 | Toko | F21S 48/1752 362/467 |
| 2016/0066372 A1* | 3/2016 | Lombardi | B60Q 1/0088 315/77 |
| 2016/0189146 A1* | 6/2016 | Cattone | G06Q 20/3829 705/71 |
| 2016/0257306 A1 | 9/2016 | Zhou et al. | |

FOREIGN PATENT DOCUMENTS

| | | |
|---|---|---|
| FR | 2893172 A1 | 5/2007 |
| JP | 2009227088 A | 10/2009 |
| JP | 201137414 A | 2/2011 |
| JP | 201451241 A | 3/2014 |
| WO | 2013080363 A1 | 6/2013 |

OTHER PUBLICATIONS

Translate_jp201451241.*
International Search Report dated Dec. 15, 2015, issued by the International Searching Authority in counterpart International Application No. PCT/JP2015/075401 (PCT/ISA/210).
Written Opinion dated Dec. 15, 2015, issued by the International Searching Authority in counterpart International Application No. PCT/JP2015/075401 (PCT/ISA/237).
Communication dated Jul. 4, 2018, issued by the State Intellectual Property Office of the People's Republic of China in counterpart Chinese Patent Application No. 201580049912.0.
Communication dated Apr. 19, 2018, issued by the European Patent Office in counterpart European Patent Application No. 15842543.9.

* cited by examiner

VEHICLE REAR LAMP

TECHNICAL FIELD

The present invention relates to a rear lamp which is capable of assisting self-driving, and particularly, to a rear lamp which enables a following vehicle to detect an own vehicle as a preceding vehicle precisely and rapidly.

BACKGROUND ART

There are self-driving techniques for detecting a white line (lane) which is drawn on a road in front of a vehicle or a preceding vehicle in front of the vehicle and controlling the driving direction of the own vehicle based on the detected results. Patent Document 1 has proposed techniques for taking an image of a front area of a vehicle and detecting a white line and a preceding vehicle from the image to control self-driving. Furthermore, as techniques for detecting a preceding vehicle in a taken image, Patent Document 2 has proposed techniques for detecting a preceding vehicle by detecting tail lamps of the preceding vehicle from bright points in the taken image.

PRIOR ART DOCUMENT

Patent Document

Patent Document 1: JP-A-2014-51241
Patent Document 2: JP-A-2009-227088

SUMMARY OF THE INVENTION

Problems to be Solved by the Invention

In the techniques for detecting a preceding vehicle from bright points in a taken image as in Patent Document 2, it is difficult to detect the preceding vehicle precisely. That is, when a front of the vehicle is imaged, various bright points of sign lamps at roads, lamps of buildings, head lamps of oncoming vehicles and the like are often taken in the image. It is difficult to distinguish the bright points of the tail lamps of the preceding vehicle from those bright points. Therefore, when performing self-driving control by detecting a preceding vehicle, it becomes difficult to control self-driving precisely.

Conventionally, the bright points in the image are detected to be bright points of the tail lamps of the preceding vehicle by verifying following attributes: the bright points of the left and right rear lamps, particularly of the tail lamps, of the preceding vehicle are imaged in a pair in a horizontal direction; the brightness (luminance) of the bright points of the left and right tail lamps are the same; the positions of the bright points of the left and right tail lamps vary together in the image; and the bright points of the tail lamps of the preceding vehicle are red. However, when a plurality of preceding vehicles are present in front of the vehicle, it is difficult to verify the above attributes since the tail lamps of these preceding vehicles are detected as a whole, and therefore, the precise detection of the preceding vehicle is obstructed. Furthermore, it takes time in detecting the preceding vehicles, so that responsiveness is poor when following the preceding vehicle, which night interfere the self-driving.

An object of the present invention is to provide a rear lamp which enables a following vehicle which drives to follow a preceding vehicle to detect the preceding vehicle precisely and rapidly and to assist self-driving of the following vehicle.

Means for Solving the Problem

The present invention provides a rear lamp disposed at a rear of a vehicle, which includes a sub-lamp in addition to a normal lamp, wherein the sub-lamp is configured to be lit on at least when a following vehicle is self-driving and the lighting is detectable by the following vehicle.

The sub-lamp of the present invention may be configured to emit near-infrared light. In addition, the sub-lamp may be configured integrally with or separately from rear lamps which are installed in the vehicle. Furthermore, the sub-lamp is lit on when the vehicle is self-driving or the following vehicle is judged to be self-driving.

Effect of the Invention

According to the present invention, the following vehicle can detect the preceding vehicle by detecting the sub-lamp in addition to the normal lamp. Since the detection of the sub-lamp can be more accurate and reliable comparing with the detection of the normal lamp, the preceding vehicle can be detected precisely and rapidly. Particularly, the sub-lamp of the preceding vehicle can be detected accurately by lighting on the sub-lamp to emit near-infrared light.

DETAILED DESCRIPTION OF EMBODIMENTS

Figure 1:
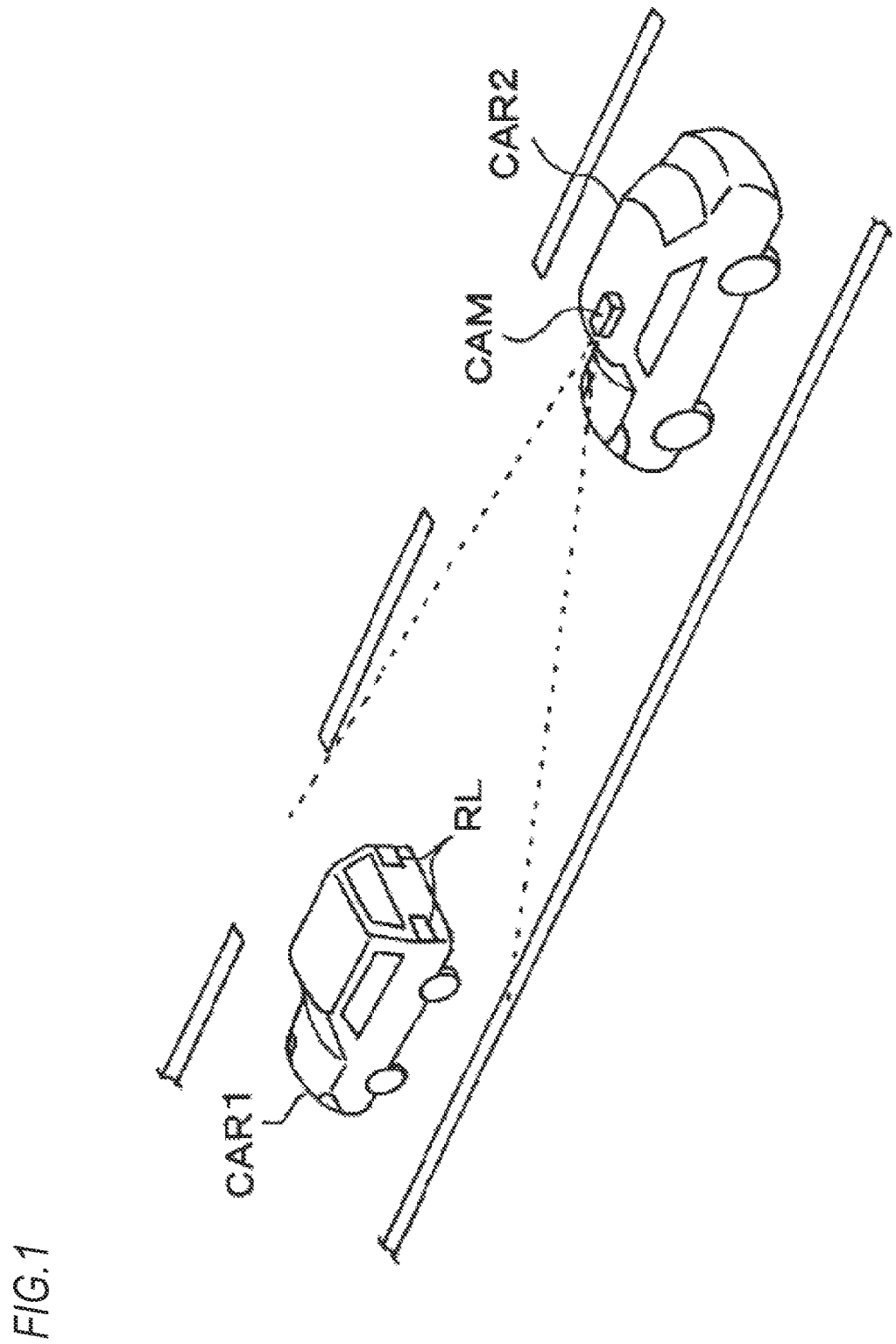
FIG. 1 is a schematic diagram illustrating self-driving.

Hereinafter, embodiments of the present invention will be described with reference to the drawings. FIG. 1 is a schematic diagram illustrating self-driving using a vehicle rear lamp according to the present invention. When an automobile CAR1 is self-driving on a road, or an automobile CAR1 is normal-driving (not self-driving) on a road and detects that a following vehicle CAR2 is following, rear lamps RL of the preceding vehicle CAR1 are set to a self-driving lighting mode. The self-driving lighting mode is automatically set when the preceding vehicle CAR1 is self-driving, while the self-driving lighting mode is set via a judgment by a driver in the preceding vehicle CAR1 when the preceding vehicle CAR1 is normal-driving. In this way, when the preceding vehicle CAR1 and the following vehicle CAR2 are present and the preceding vehicle CAR1 is set to the self-driving lighting mode, the rear lamps RL of the preceding vehicle CAR1 are lit on differently from the normal-driving lighting mode.

The following vehicle CAR2 under self-driving takes an image of a front area by an imaging device CAM installed in the own vehicle and detects the preceding vehicle CAR1 based on the image. Detecting the preceding vehicle CAR1 is performed based on the bright points of the rear lamps RLs of the preceding vehicle CAR1 appearing in the image. In the present invention, when the rear lamps RL of the preceding vehicle CAR1 are set to the self-driving lighting mode, the following vehicle CAR2 detects a unique bright point in the image, and thus, the following vehicle CAR2 can detect the preceding vehicle CAR1 based on the bright point. When the preceding vehicle CAR1 is detected, the following vehicle CAR2 is set to self-driving to follow the detected preceding vehicle CAR1. Description of self-driving in detail is omitted herein.

First Embodiment

Figure 2A:
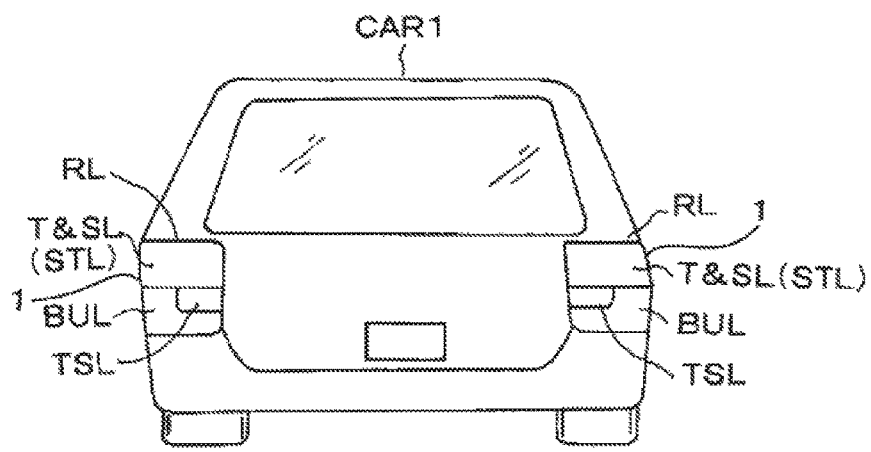
FIG. 2A is a rear view of an automobile (preceding vehicle) including a rear lamp of a first embodiment.

FIG. 2A is a rear view of a preceding vehicle CAR1, i.e., an automobile, including rear lamps according to a first embodiment of the present invention. Rear lamps RLs are disposed respectively in the left and right of the rear of the body panel of the automobile CAR1. Each rear lamp RL is configured as a rear combination lamp of which a tail and stop lamp T&SL, a backup lamp BUL and a turn signal lamp TSL are incorporated integrally in a lamp housing 1. Since those lamps T&SL, BUL, TSL simply use existing rear lamps which are normally lit on as rear lamps, detailed description thereof is omitted herein.

Figure 2B:
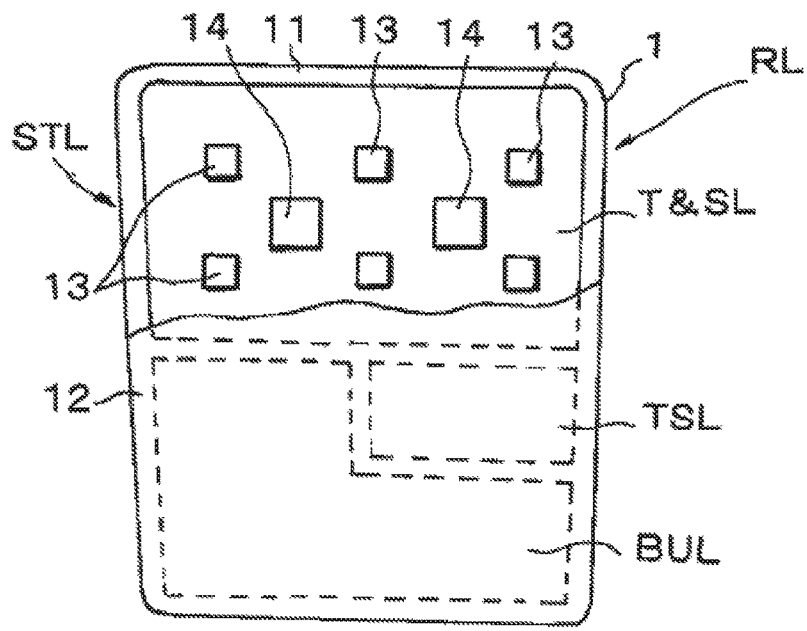
FIG. 2B shows a partial section of the front view of the rear lamp.

FIG. 2B shows a partial section of the front view of a left rear lamp RL as seen from the rear of the automobile. Although not shown in the drawings, a right rear lamp has a similar structure and is symmetric with the left rear lamp RL. The lamp housing 1 of the rear lamps RLs includes a lamp base 11 and a transparent front cover 12 attached to the front of the lamp base 11. The interior of the lamp base 11 is divided into a plurality of areas. Light sources are respectively disposed in each of the divided areas to form the lamps T&SL, BUL, TSL.

The tail and stop lamp T&SL is configured as a plurality of red LEDs (semiconductor light-emitting elements) 13 as light sources disposed inside the lamp base 11. The red LEDs 13 emit light with low brightness as tail lamp and emit light with high brightness as stop lamp. Furthermore, the sub-tail lamp STL is provided integrally with the tail and stop lamp T&SL which is installed in the automobile in the first embodiment.

As shown in FIG. 2B, the sub-tail lamp STL uses a plurality of near-infrared LEDs 14 as light sources. The near-infrared LEDs 14 together with the red LEDs 13 of the tail and stop lamp T&SL is disposed in the divided areas of the lamp base 11. The near-infrared LEDs 14 are controlled to be lit on independently from the red LEDs 13. The near-infrared LEDs 14 are lit on when set in the self-driving lighting mode.

Figure 3A:
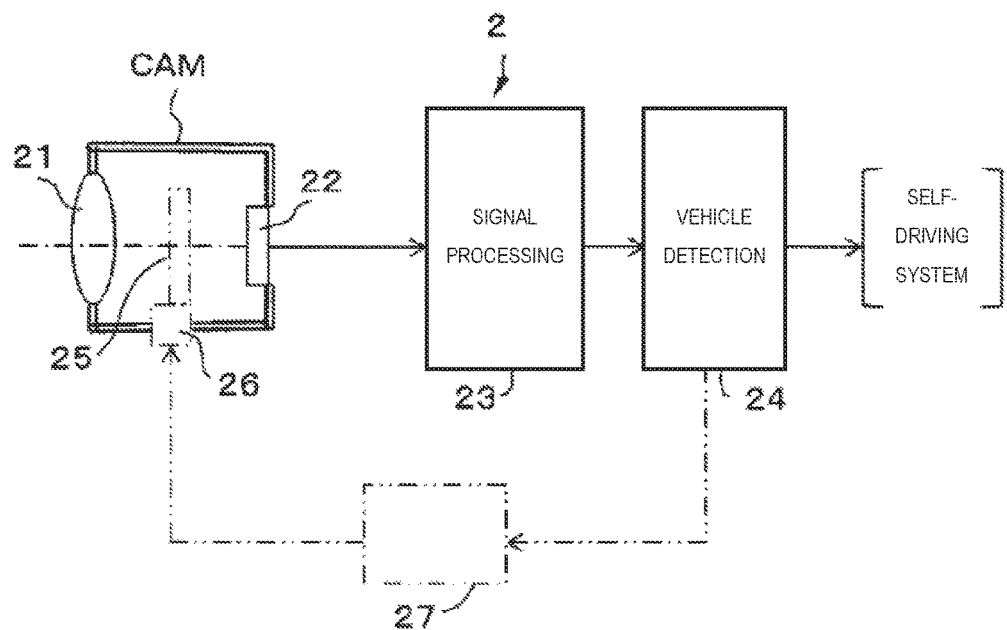
FIG. 3A is a block diagram of a preceding-vehicle detecting device for a following vehicle.

FIG. 3A is a schematic diagram of a preceding-vehicle detecting device 2 provided in the following vehicle CAR2. The imaging device CAM shown in FIG. 1 includes an imaging optical system 21 and an imaging element 22. The imaging device CAM takes an image of the front area of the vehicle. The imaging device CAM is connected to a signal processing unit 23 which processes the obtained imaging signal and obtains the image and is further connected to a vehicle detecting unit 24 which detects the preceding vehicle by analyzing the obtained image.

Figure 3B:
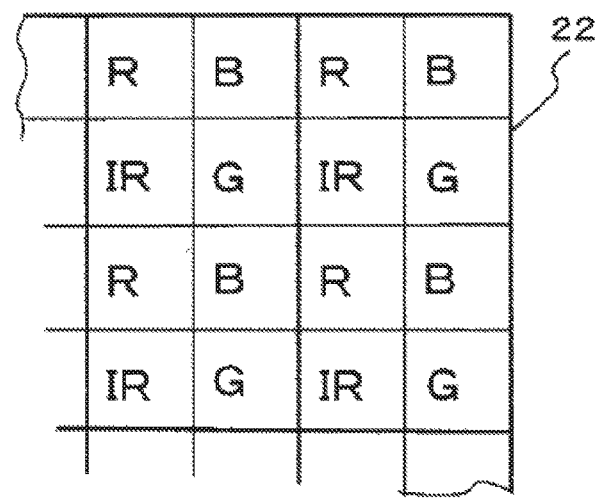
FIG. 3B is a pixel arrangement diagram of an imaging element.
Figure 4A:
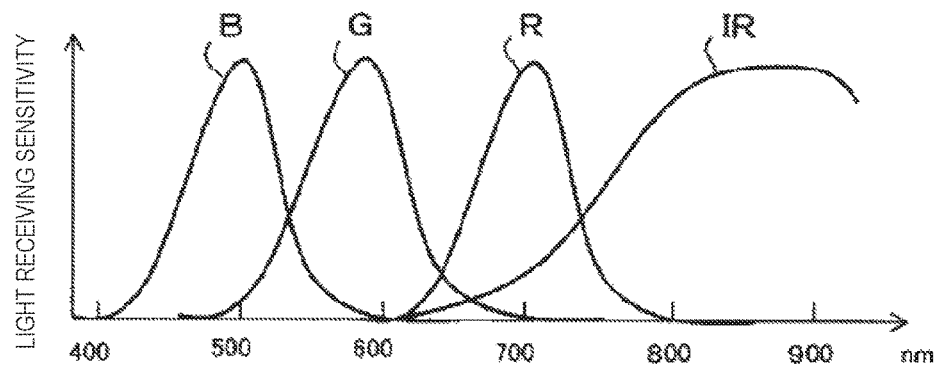
FIG. 4A shows spectral characteristics in the preceding-vehicle detecting device.
Figure 4B:
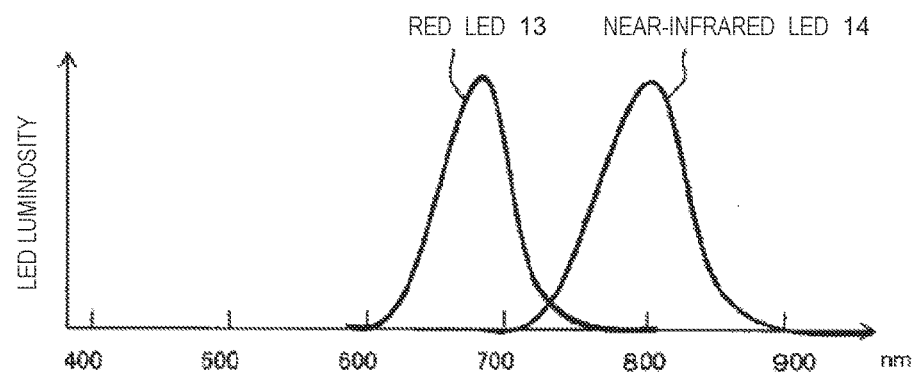
FIG. 4B shows spectral characteristics in the preceding-vehicle detecting device.

The imaging element 22 is configured by arranging semiconductor light receiving elements in a matrix form, such as CCD, CMOS. As shown in FIG. 3B, the imaging element 22 is composed of CMOS imaging elements obtained by replacing one pixel B (blue) among pixels B (blue), G (green), and R (red) which form a Bayer Array with an pixel IR (near-infrared). Therefore, as shown in FIG. 4A, the imaging element 22 has a light receiving sensitivity of receiving light having light regions of B, G, R and IR. Particularly, as shown in FIG. 4B, the light receiving sensitivities of R and IR correspond to spectroscopic luminosities of the red LEDs 13 and the near-infrared LEDs 14.

Figure 4C:
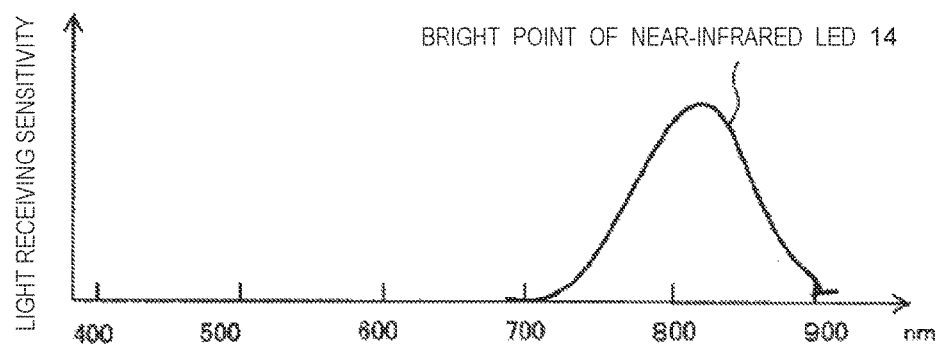
FIG. 4C shows spectral characteristics in the preceding-vehicle detecting device.

The vehicle detecting unit 24 detects the preceding vehicle CAR1 by detecting the bright points in the image, i.e., the bright points of the rear lamps RLs of the preceding vehicle CAR1. Therefore, the vehicle detecting unit 24 detects the bright points of the rear lamps RLs having light from the visible region to the near-infrared region when all signals of pixels B, G, R, and IR processed by the signal processing unit 23 are selected. As shown in FIG. 4C, the vehicle detecting unit 24 only detects the light emitted by the near-infrared LEDs 14, i.e., the bright points of the sub-tail lamp STL, when only the signal of the pixel IR is selected.

Although description is omitted herein, a self-driving system provided in the following vehicle CAR2 controls the speed and steering of the vehicle to follow the preceding vehicle CAR1 detected by the vehicle detecting unit 24, thereby performing self-driving.

In the case shown in FIG. 1, the preceding vehicle CAR1 is not set to the self-driving lighting mode when the preceding vehicle CAR1 is normal driving, or a driver of the preceding vehicle CAR1 judges that the following vehicle CAR2 is not self-driving. Therefore, the rear lamps RL of the preceding vehicle CAR1 are set in the normal lighting mode. The rear lamps RL of the preceding vehicle CAR1 are automatically set to the self-driving lighting mode when the preceding vehicle CAR1 is self-driving. Alternatively, even if the preceding vehicle CAR1 is normal driving, the rear lamps RL thereof are manually set to the self-driving lighting mode when the driver of the preceding vehicle CAR1 judges that the following vehicle CAR2 is self-driving.

The sub-tail lamps STL are lit on when the tail and stop lamps T&SL of the rear lamps RL are lit on when the self-driving lighting mode is set. That is, the visible light of the red LEDs 13 is emitted from the preceding vehicle CAR1, and the near-infrared light of the near-infrared LEDs 14 of the sub-tail lamps STL is emitted from the preceding vehicle CAR1 at the same time when the tail and stop lamps T&SL are lit on as the tail lamps. At this time, since the near-infrared light emitted from the sub-tail lamps STL is invisible for the driver in the following vehicle CAR2, it will not cause the driver to misunderstand that the stop lamps of the preceding vehicle CAR1 are lit on.

Figure 5A:
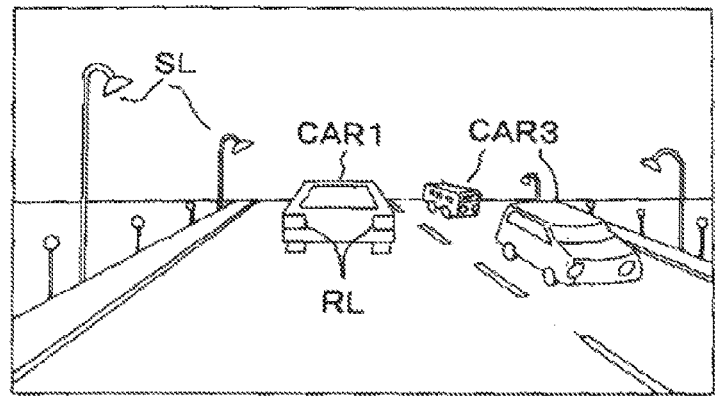
FIG. 5A is an image for detecting a preceding vehicle which is taken by a following vehicle.

The imaging device CAM of the preceding-vehicle detecting device 2 of the following vehicle CAR2 takes an image of the front area of the vehicle when the following vehicle CAR2 is self-driving. As shown in FIG. 5A, the rear lamps RL of the preceding vehicle CAR1 are taken in the image. Then, the vehicle detecting unit 24 detects the bright points of the rear lamps RL of the preceding vehicle CAR1 from the taken image. In this case, the vehicle detecting unit 24 selects signals of all pixels B, G, R, and IR of the imaging element 22 as a first detection or selects only the signal of the pixel R, thereby detecting the bright points of the red LEDs 13 as shown in FIG. 4B.

Figure 5B:
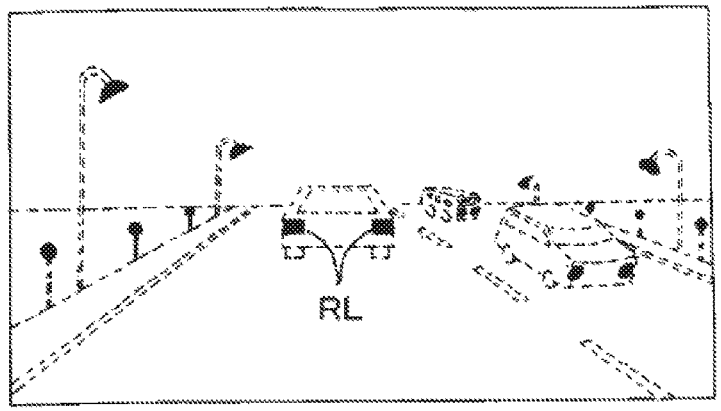
FIG. 5B is an image for detecting a preceding vehicle which is taken by a following vehicle.

In the first detection, the vehicle detecting unit 24 detects the preceding vehicle CAR1 based on a pair of bright points in visible region appearing in the image. That is, as shown in FIG. 5B, the left and right rear lamps RL of the preceding vehicle CAR1 are imaged as a pair of bright points (black parts in the figure) aligned at a predetermined interval at left and right in the image during the first detection. The pair of bright points moves synchronously with the movement of the preceding vehicle CAR1. Thus, the vehicle detecting unit 24 can detect the preceding vehicle CAR1 by detecting a pair of bright points with such behavior.

However, the image also contains the bright points of head lamps of an oncoming vehicle CAR3 and the bright points of road sign lamps and street lamps SL. It is difficult to only detect the bright points of the rear lamps RL of the preceding vehicle CAR1 as all the bright points are mixed. The vehicle detecting unit 24 will only select the signal of the pixel IR of the imaging element 22 and detect the bright points of the near-infrared LEDs 14, which is shown in FIG. 4B, as a second detection if the preceding vehicle CAR1 cannot be properly detected by the vehicle detecting unit 24 due to the above reason.

Figure 5C:
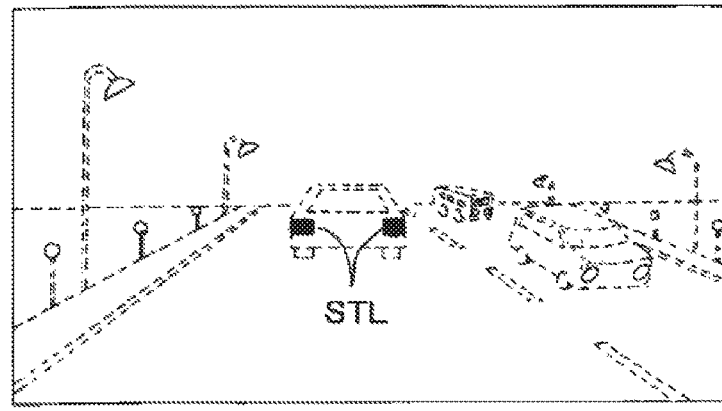
FIG. 5C is an image for detecting a preceding vehicle which is taken by a following vehicle.

As shown in FIG. 5C, the bright points of the visible light are removed and only the bright points of the near-infrared light are left in the image during the second detection. That is, only the bright points of the light emitted by each near-infrared LED 14 of the sub-stop lamps STL which are respectively at the left and right rear lamps RL of the preceding vehicle CAR1 are imaged.

In this image, the left and right sub-tail lamps STL of the preceding vehicle CAR1 are taken as a pair of bright points aligned at a predetermined interval in the left and right, the same as in the first detection, so that the vehicle detecting unit 24 can detect the preceding vehicle CAR1 by detecting the pair of bright points. Although road sign lamps and street lamps SL may emit near-infrared light, the amount thereof is extremely small comparing to the visible light even if the bright points of the near-infrared light are taken in the image.

Therefore, comparing to the first detection, the bright points for the vehicle detecting unit 24 as the detection objects in the second detection is extremely less, and those are less mixed, so that the preceding vehicle CAR1 can be detected precisely and rapidly. In this way, an appropriate self-driving is assisted by detecting the preceding vehicle CAR1 precisely and rapidly, particularly in a case where the following self-driving vehicle CAR2 follows the preceding vehicle CAR1. Incidentally, the second detection may be performed without the first detection, and thus, the preceding vehicle CAR1 can be detected more rapidly.

Second Embodiment

Figure 6:
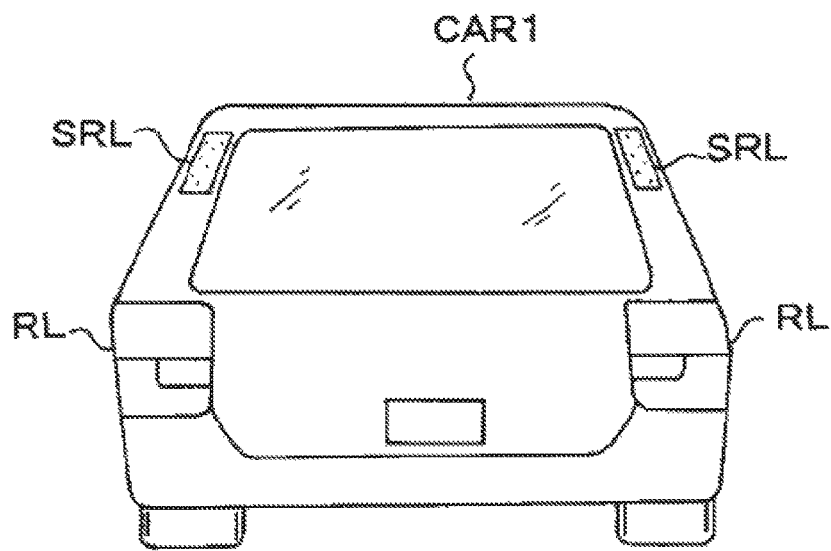
FIG. 6 is a rear view of an automobile (preceding vehicle) including a rear lamp of a second embodiment.

FIG. 6 is a rear view of an automobile including a rear lamp of a second embodiment of the present invention. In the second embodiment, sub-rear lamps SRL, which are independent from left and right rear lamps RL, are disposed at the rear of the preceding vehicle CAR1. That is, the rear lamps RL are disposed respectively at the left and right of the rear of the body panel of the automobile CAR1. The rear lamps RL have the same structure as that of the existing rear lamps. Furthermore, the sub-rear lamps SRL, which are independent from the installed rear lamps RLs, are disposed respectively at the left and right of an upper portion of the rear of the body panel. The sub-rear lamps SRL are located in left and right pillars near the roof panel. The sub-rear lamps SRL are configured as a lamp in which near-infrared LEDs are mounted in the lamp housing as light sources (not shown). The near-infrared LEDs of the sub-rear lamps SRL, which are independent from the rear lamps RL, are lit on when set to the self-driving lighting mode.

According to the second embodiment, the vehicle detecting unit 24 of the preceding-vehicle detecting unit 2 of the following vehicle CAR2 constantly detects signals of all pixels, i.e., pixels B, G, R and IR, of the imaging element 22 of the imaging device CAM. Therefore, the vehicle detecting unit 24 detects a left-right pair of bright points of the visible light of the left and right rear lamps RL of the preceding vehicle CAR1 and a left-right pair of bright points of the near-infrared light of the left and right sub-rear lamps SRL of the preceding vehicle CAR1 at the same time.

In the second embodiment, the preceding vehicle CAR1 lights on the left and right rear lamps RL without lighting the sub-rear lamps SRL when normal driving. The preceding vehicle CAR1 lights on the left and right rear lamps RL and the left and right sub-rear lamps SRL at the same time in the self-driving lighting mode. Since the light of the left and right sub-rear lamps SRL are invisible, it will not cause the driver of the following vehicle CAR2 to misunderstand that stop lamps of the preceding vehicle CAR1 are lit on.

The left-right pair of bright points of the visible light of the rear lamps RL and the left-right pair of bright points of the near-infrared light of the sub-rear lamps SRL are obtained in the image simultaneously when the rear lamps RL and the sub-rear lamps SRL of the preceding vehicle CAR1 are in the self-driving lighting mode and an image is taken in the following vehicle CAR2. Thus, the vehicle detecting unit 24 detects the two pairs of bright points. Since the two pairs of bright points, i.e., four bright points, move synchronously with the preceding vehicle CAR1, the vehicle detecting unit 24 can detect the preceding vehicle precisely and rapidly by detecting the two pairs of synchronously moving bright points.

Third Embodiment

Figure 7A:
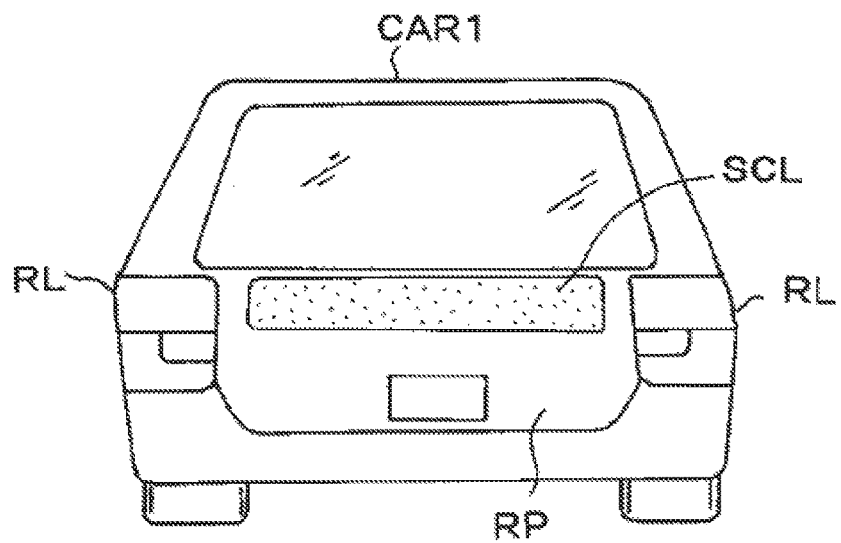
FIG. 7A is a rear view of an automobile (preceding vehicle) including a rear lamp of a third embodiment.

FIG. 7A is a rear view of an automobile including a rear lamp of a third embodiment of the present invention. In center of a rear panel RP of the automobile, i.e., the area between left and right rear lamps RL in the rear of the body panel, a sub-center lamp SCL is disposed independently of the area from installed rear lamps RL. The sub-center lamp SCL includes a front cover which has light absorbing function.

Figure 7B:
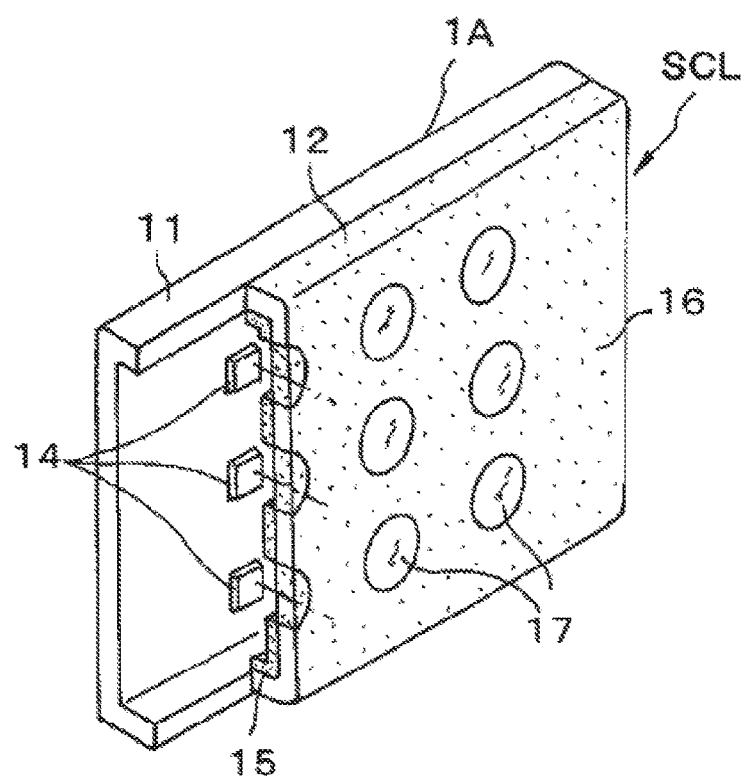
FIG. 7B shows a partial section of the perspective view of a sub-center lamp.

FIG. 7B shows a partial section of perspective view of the sub-center lamp SCL, whose lamp housing 1A includes a lamp base 11 and a front cover 12. The front cover 12 is made of transparent material. The interior area, excluding the areas having a plurality of dots, is coated with light absorbing material 15 such as carbon black. Therefore, the area coated with carbon black is a light absorbing area 16 and the dotted areas without carbon black are transparent areas 17. The transparent areas 17 having a plurality of dots are arranged in a matrix form. Incidentally, in FIG. 7B, three transparent areas 17 are shown in a vertical direction in order to simplify the illustration. More transparent areas are formed in practice. Furthermore, instead of the above structure, a light absorbing plate having a plurality of through holes along the thickness direction may be used, and the light absorbing plate may be adhered to an outer surface or the inner surface of the front cover 12 made of the transparent material.

Near-infrared LEDs 14, which are same as those of the first and second embodiments, are disposed to face the transparent areas 17 respectively in the lamp housing 1A. The near-infrared LEDs are lit on independently from the rear lamps RL when set to a self-driving lighting mode. The light from the near-infrared LEDs 14 passes through the transparent areas 17 of the front cover 12. Incidentally, the near-infrared LEDs 14 may not necessarily correspond to the transparent areas 17 respectively, and light from one near-infrared LED 14 may pass through a plurality of transparent areas 17.

In the third embodiment, the vehicle detecting unit 24 of the preceding vehicle detecting unit 2 of the following vehicle CAR2 constantly detects signals of all pixels B, G, R and IR of an imaging element 22. Therefore, the vehicle detecting unit 24 detects a left-right pair of bright points of visible light of the left and right rear lamps RL of the preceding vehicle CAR1 and a bright point of near-infrared light of a sub-center lamp SCL at the same time.

In the third embodiment, the preceding vehicle CAR1 lights on only the rear lamps RL in a normal driving. Both the sub-center lamp SCL and the rear lamps RL are lit on in the self-driving lighting mode. A part of light from the rear lamps RL may be reflected by the surface of the rear panel RP of the automobile when the rear lamps RL are lit on. Particularly, it becomes difficult for the following vehicle CAR2 to distinguish bright points between the left and right rear lamps RL when the reflected light by the rear panel RP between the rear lamps RL mixed together with the light directly from the left and right rear lamps RL. In contrast, the light of the left and right rear lamps RL is not reflected by the surface of the sub-center lamp SCL since the front cover 12 of the sub-center lamp SCL has a light absorbing function in the third embodiment. Therefore, the light of the left and right rear lamps RL can be distinguished as independent bright points, so that the preceding vehicle CAR1 can be detected precisely and rapidly.

In addition, the light patterns in a matrix form are obtained when the near-infrared LEDs 14 of the sub-center lamp SCL emit light respectively through the transparent areas 17 on the front cover 12. A plurality of bright points of the sub-center lamp SCL arranged in a matrix form are detected between the left and right pair of bright points of the rear lamps RL when the preceding vehicle CAR1 is imaged by the following vehicle CAR2. The light patterns which have the plurality of bright points in a matrix form between the left and right pair of bright points are not present in a normal automobile driving environment. The following vehicle CAR2 can precisely and rapidly detects the preceding vehicle CAR1 by detecting the light patterns. The light patterns of the sub-center lamp SCL are formed by near-infrared light and invisible for the driver in the following vehicle CAR2, so the driver does not feel uncomfortable and troublesome.

Incidentally, in the third embodiment, the specific light patterns may be configured by the near-infrared LEDs 14 of the sub-center lamp SCL. That is, the transparent areas 17 form a pattern. Alternatively, any light pattern may be formed by selectively making some of the near-infrared LEDs 14 in a matrix form to emit light.

The light pattern, as in this case for example, can be configured to make the necessary driving information of the preceding vehicle CAR1 as a coded light pattern, such as a bar code, a QR code (registered trademark). The following vehicle CAR2 which images the preceding vehicle CAR1 detects and decodes the code displayed by the light patterns, so that the driving information of the preceding vehicle CAR1 can be obtained. Accordingly, the following vehicle CAR2 can precisely self-drive by obtaining the driving information of the preceding vehicle CAR1.

In the first to third embodiments, the sub-tail lamps, the sub-rear lamps and the sub-center lamp, which function as sub-lamps for detecting the preceding vehicle, are configured as a lamp emitting near-infrared light, so as not to cause misunderstanding or discomfort for the driver of the following vehicle when the driver sees the lighting from the preceding vehicle, as described above. Therefore, the lamps may emit visible light or light including a visible region when the misunderstanding and discomfort of the driver is not considered or do not occur.

Furthermore, in the first to third embodiments, the optical intensity and polarization of the light of the sub-tail lamps, the sub-rear lamps and the sub-center lamp may be modulated based on the driving information of the preceding vehicle when emitting the near-infrared light. The following vehicle can obtain the driving information of the preceding vehicle by demodulating the modulated near-infrared light, which is useful in assisting self-driving.

Incidentally, in the embodiments, the signal of a pixel IR is selected in order to split the visible light and the near-infrared light. Alternatively, the receiving region of light receivable by the imaging element 22 may be selected by an optical filter. As shown by the dash dot line in FIG. 3A, for example, a near-infrared filter 25 which transmits the near-infrared light is provided in the imaging device CAM. The near-infrared filter 25 may advance and retreat in a light receiving path of the imaging element 22 via a filter driving unit 26 which is controlled by a filter controlling unit 27. Only the bright points of the near-infrared light can be detected when the near-infrared filter 25 advances in the light receiving path. Alternatively, instead of the near-infrared filter, a tuning filter capable of tuning the transparent areas by changing the applied voltage may be used to only detect the bright points of the near-infrared light.

This application is based on Japanese Patent Application No. 2014-188460 filed on Sep. 17, 2014, the content of which is incorporated herein by reference.

INDUSTRY APPLICABILITY

The present invention can be used as a rear lamp which is effective in assisting self-driving when the following vehicle follows the preceding vehicle.

The invention claimed is:

1. A vehicle rear lamp which is disposed at a rear of a vehicle, the vehicle rear lamp comprising:
   a sub-lamp which is detectable by a following vehicle when turned on; and
   a main lamp,
   wherein the vehicle rear lamp has a normal-driving lighting mode and a self-driving lighting mode, and
   wherein the sub-lamp is configured to be turned on and off concurrently with the main lamp in the self-driving lighting mode, and the sub-lamp is configured to be not turned on with the main lamp in the normal-driving lighting mode.

2. The vehicle rear lamp according to claim 1,
   wherein the sub-lamp is configured to emit near-infrared light.

3. The vehicle rear lamp according to claim 2,
wherein the sub-lamp is configured integrally with or separately from the rear lamp installed in the vehicle.

4. The vehicle rear lamp according to claim 1,
wherein the sub-lamp is turned on when the vehicle is self-driving or the following vehicle is judged to be in self-driving.

5. The vehicle rear lamp according to claim 1, wherein the sub-lamp is configured to be turned on and turned off concurrently with the main lamp.

6. The vehicle rear lamp according to claim 5, wherein the main lamp comprises a tail lamp and a brake lamp.

7. The vehicle rear lamp according to claim 2, wherein the near-infrared light is controlled to be turned on independently from the main lamp.

8. The vehicle rear lamp according to claim 1,
wherein the sub-lamp is arranged at a center of the rear of the vehicle, and
wherein the sub-lamp include an outer cover which has light absorbing function.

9. The vehicle rear lamp according to claim 1,
wherein the sub-lamp includes a plurality of near-infrared LEDs arranged in a matrix form to form a light pattern which is determined based on a driving condition of the vehicle.

10. The vehicle rear lamp according to claim 1,
wherein the sub-lamp is configured to emit light which has intensity or polarization modulated based on a driving condition of the vehicle.

\* \* \* \* \*